United States Patent
Mina et al.

(10) Patent No.: US 7,487,473 B2
(45) Date of Patent: Feb. 3, 2009

(54) ENABLING NETLIST FOR MODELING OF TECHNOLOGY DEPENDENT BEOL PROCESS VARIATION

(75) Inventors: Essam Mina, South Burlington, VT (US); William Piper, Hinesburg, VT (US); Wayne H. Woods, Jr., Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 11/531,023

(22) Filed: Sep. 12, 2006

(65) Prior Publication Data

US 2008/0066024 A1    Mar. 13, 2008

(51) Int. Cl.
     *G06F 17/50*         (2006.01)
(52) U.S. Cl. .................... 716/1; 716/2; 716/3; 716/18; 703/13; 703/14
(58) Field of Classification Search ................. 716/1–3, 716/4, 5, 18; 703/2, 13, 14
See application file for complete search history.

(56) References Cited

U.S. PATENT DOCUMENTS

| | | | |
|---|---|---|---|
| 4,924,589 A | 5/1990 | Leedy | |
| 5,629,858 A | 5/1997 | Kundu et al. | |
| 5,867,396 A | 2/1999 | Parlour | |
| 6,081,623 A * | 6/2000 | Bloomfield et al. | 382/239 |
| 6,128,768 A * | 10/2000 | Ho | 716/5 |
| 6,236,746 B1 | 5/2001 | Chamberlain et al. | |
| 6,289,116 B1 | 9/2001 | Chamberlain et al. | |
| 6,314,194 B1 | 11/2001 | Michael et al. | |
| 6,651,236 B2 | 11/2003 | Ichimiya et al. | |
| 6,675,139 B1 | 1/2004 | Jetton et al. | |
| 6,769,107 B1 | 7/2004 | Watkins | |
| 6,904,576 B2 | 6/2005 | Ng et al. | |
| 6,925,626 B2 | 8/2005 | Nguyen et al. | |
| 2005/0086615 A1 * | 4/2005 | Anand et al. | 716/1 |

OTHER PUBLICATIONS

Malavasi et al., Impact Analysis of Process Variability on Digital Circuit with Performance Limited Yield, IEEE, 2001, pp. 60-63.*

* cited by examiner

*Primary Examiner*—Thuan Do
*Assistant Examiner*—Nghia M Doan
(74) *Attorney, Agent, or Firm*—Richard M. Kotulak; Hoffman Warnick LLC

(57) ABSTRACT

A method, system and program product are disclosed that enable a netlist of an integrated circuit (IC) design for modeling of technology dependent back-end-of-line (BEOL) process variation. In one embodiment, the method includes obtaining a netlist of electrical elements (i.e., BEOL parasitic resistance and/or capacitance), the netlist including estimated electrical values for the electrical elements and geometric data for at least one of the electrical elements; determining variations of the electrical value for a selected electrical element based on the geometric data using a scaling methodology; and placing a model call in the netlist, the model call implementing the variations of electrical value for the selected electrical element. The revised netlist can be used to model the IC design and includes a scaling of electrical values without having to generate more than one netlist.

17 Claims, 2 Drawing Sheets

ENABLING NETLIST FOR MODELING OF TECHNOLOGY DEPENDENT BEOL PROCESS VARIATION

BACKGROUND OF THE INVENTION

1. Technical Field

The invention relates generally to integrated circuit (IC) design, and more particularly, to a method, system and program product enabling a netlist for modeling of technology dependent back-end-of-line (BEOL) process variation.

2. Background Art

In the integrated circuit (IC) design industry, parasitic extraction is used to model capacitance and resistance values of structures within an integrated circuit (IC) design. Numerous entities provide parasitic extractors, such as Star (available from Synopsis) or Calibre (available from Mentor Graphics), that are capable of this function. Typically, the parasitic extraction provides a list of structures and their connection points which are connected in each net of the IC design, which is referred to as a netlist, and their corresponding parasitic capacitance and resistance values. These locations or structures are identified within the IC design as a pair of resistors (e.g., R1, R2) and a capacitor (e.g., C1). Each of the resistors and the capacitor are identified by a pair of nodes, e.g., a net to which they belong, between which each extends. For example, a capacitor C1 may be located between nodes identified as: 140:13936 and 146:13901, and may have a capacitance of 1.26475e-19 Farads (F). Each resistor R1, R2 shares one of the nodes with capacitor C1. For example, a resistor R1 may share node 146:13901 with capacitor C1 and have a resistance value of 13.6585, and another resistor R2 may share node 140:13936 with capacitor C1 and have a resistance value of 0.08815. Note, that the capacitor and resistor identifications are arbitrary. Each resistor may also include a variety of comments that aid in identifying the resistor. For example, each resistor may include a level comment to identify the level at which it terminates, e.g., metal level 2. For example, resistor R1 may include a level comment L=21, and resistor R2 may include a level comment L=23. In that example, capacitor C1 represents a capacitance that extends between levels because the level indications are not the same, but that is not always the case. That is, if the level comments are identical, the capacitor represents a capacitance that extends laterally. Each resistor may also include a corresponding width comment and length comment of the structure which it represents, e.g., wire.

One shortcoming of conventional parasitic extractors is that they do not allow for Monte Carlo modeling of the capacitance and resistance values based on a particular technology without generating three different netlists, i.e., one each for the maximum value scenario, nominal value scenario and minimum value scenario. In a Monte Carlo model, values are specified as a distribution, typically a Gaussian distribution, with a specified nominal value and a multiple standard deviation to a maximum value and a minimum value. Unfortunately, generating three different netlists is very time consuming and expensive.

There is a need in the art for a solution to one or more of the problems of the related art.

SUMMARY OF THE INVENTION

A method, system and program product are disclosed that enable a netlist of an integrated circuit (IC) design for modeling of technology dependent back-end-of-line (BEOL) process variation. In one embodiment, the method includes obtaining a netlist of electrical elements (i.e., BEOL parasitic resistance and/or capacitance), the netlist including estimated electrical values for the electrical elements and geometric data for at least one of the electrical elements; determining variations of the electrical value for a selected electrical element based on the geometric data using a scaling methodology; and placing a model call in the netlist, the model call implementing the variations of electrical value for the selected electrical element. The revised netlist can be used to model the IC design and includes a scaling of electrical values without having to generate more than one netlist.

A first aspect of the invention provides a method of enabling a netlist of an integrated circuit (IC) design for modeling of technology dependent BEOL process variation, the method comprising: obtaining a netlist of electrical elements, the netlist including estimated electrical values for the electrical elements and geometric data for at least one of the electrical elements; determining variations of the electrical value for a selected electrical element based on the geometric data using a scaling methodology; and placing a model call in the netlist, the model call implementing the variations of electrical value for the selected electrical element.

A second aspect of the invention provides a system for enabling a netlist of an integrated circuit (IC) design for modeling of technology dependent BEOL process variation, the system comprising: an obtainer for obtaining a netlist of electrical elements, the netlist including estimated electrical values for the electrical elements and geometric data for at least one of the electrical elements; a determinator for determining variations of the electrical value for a selected electrical element based on the geometric data using a scaling methodology; and a placer for placing a model call in the netlist, the model call implementing the variations of electrical value for the selected electrical element.

A third aspect of the invention provides a program product stored on a computer-readable medium, which when executed, enables a netlist of an integrated circuit (IC) design for modeling of technology dependent BEOL process variation, the program product comprising: program code for obtaining a netlist of electrical elements, the netlist including estimated electrical values for the electrical elements and geometric data for at least one of the electrical elements; program code for determining variations of the electrical value for a selected electrical element based on the geometric data using a scaling methodology; and program code for placing a model call in the netlist, the model call implementing the variations of electrical value for the selected electrical element.

A fourth aspect of the invention provides a business method for enabling a netlist of an integrated circuit (IC) design for modeling of technology dependent BEOL process variation, the business method comprising managing a computer infrastructure that performs each of the steps of the invention; and receiving payment based on the managing step.

A fifth aspect of the invention provides a method of generating a system for enabling a netlist of an integrated circuit (IC) design for modeling of technology dependent BEOL process variation, the method comprising: obtaining a computer infrastructure; and deploying means for performing each of the steps of the invention to the computer infrastructure.

The illustrative aspects of the present invention are designed to solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
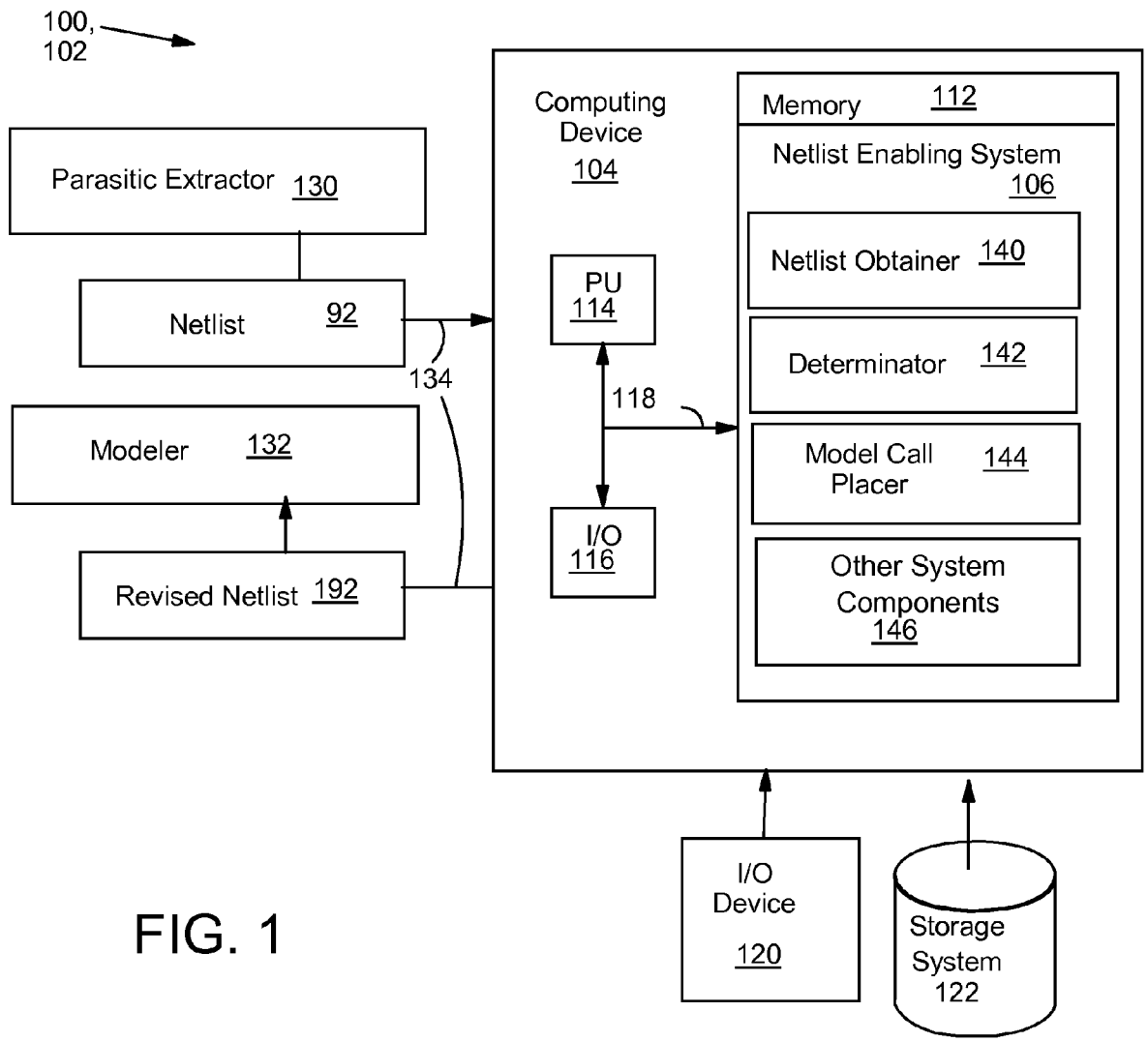
FIG. 1 shows a block diagram of an illustrative environment and computer infrastructure for implementing one embodiment of the invention.

It is noted that the drawings of the invention are not to scale. The drawings are intended to depict only typical aspects of the invention, and therefore should not be considered as limiting the scope of the invention.

In the drawings, like numbering represents like elements between the drawings.

DETAILED DESCRIPTION

Turning to the drawings, FIG. 1 shows an illustrative environment 100 for enabling a netlist 92 of an integrated circuit (IC) design for modeling of technology dependent back-end-of-line (BEOL) process variation. To this extent, environment 100 includes a computer infrastructure 102 that can perform the various processes described herein. In particular, computer infrastructure 102 is shown including a computing device 104 that comprises a netlist enabling system 106, which enables computing device 104 to enable a netlist 92 of an IC design (not shown) for modeling of technology dependent BEOL process variation by performing the processes of the invention.

Computing device 104 is shown including a memory 112, a processor unit (PU) 114, an input/output (I/O) interface 116, and a bus 118. Further, computing device 104 is shown in communication with an external I/O device/resource 120 and a storage system 122. In general, processor unit 114 executes computer program code, such as netlist enabling system 106, which is stored in memory 112 and/or storage system 122. While executing computer program code, processor unit 114 can read and/or write data, such as netlist 92, to/from memory 112, storage system 122, and/or I/O interface 116. Bus 118 provides a communications link between each of the components in computing device 104. I/O device 120 can comprise any device that enables a user to interact with computing device 104 or any device that enables computing device 104 to communicate with one or more other computing devices.

In any event, computing device 104 can comprise any general purpose computing article of manufacture capable of executing computer program code installed by a user (e.g., a personal computer, server, handheld device, etc.). However, it is understood that computing device 104 and netlist enabling system 106 are only representative of various possible equivalent computing devices that may perform the various process steps of the invention. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and/or hardware can be created using standard programming and engineering techniques, respectively.

Similarly, computer infrastructure 102 is only illustrative of various types of computer infrastructures for implementing the invention. For example, in one embodiment, computer infrastructure 102 comprises two or more computing devices (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

To this extent, computer infrastructure 102 can further comprise a conventional parasitic extractor 130 and/or a conventional modeler 132. Parasitic extractor 130 may include any now known or later developed IC design analyzer used to generate netlist 92 modeling capacitance and resistance values of structures within an IC design, and include comments for certain electrical elements. As used herein, "electrical element" includes any manner of back-end-of-line (BEOL) parasitic resistance and/or capacitance. It is also understood that "resistor" and "capacitor" represent BEOL parasitic resistances and capacitances, respectively. Numerous entities provide parasitic extractors, such as Star (available from Synopsis) or Calibre (available from Mentor Graphics), that are capable of determining the existence of these structures. As described above, for example, each resistor in a netlist 92 may include a variety of comments that aid in identifying the resistor. For example, each resistor may include a level comment to identify the level at which it terminates, e.g., metal level 2. For example, resistor R1 may include a level comment L=21, and resistor R2 may include a level comment L=23. In that example, a related capacitor C1 represents a capacitance that extends between resistors R1, R2, and represents a capacitance that extends between levels because the level indications are not the same, but that is not always the case. That is, if the level comments are identical, the capacitor represents a laterally extending capacitance. Each resistor may also include a corresponding width comment and length comment of the structure which it represents, e.g., wire. Modeler 132 may include any now known or later developed IC design modeling system such as HSPICE, available from Synopsis. Parasitic extractor 130 and/or modeler 132 are shown in communication with computing device 104 over a communications link(s) 134. As discussed above, communications link(s) 134 can comprise any combination of various types of communications links as is known in the art. In one embodiment, parasitic extractor 130 and/or modeler 132 comprises a computing device that is in communication with computing device 104 over a local area network. Regardless, it is understood that parasitic extractor 130 and/or modeler 132 can comprise the same components (processor, memory, I/O interface, etc.) as shown for computing device 104. These components have not been separately shown and discussed for clarity. In addition, netlist enabling system 106 may be implemented as part of parasitic extractor 130 and/or modeler 132.

As previously mentioned and discussed further below, netlist enabling system 106 enables computing infrastructure 102 to enable netlist 92 for modeling of technology dependent BEOL process variation. To this extent, netlist enabling system 106 is shown including a netlist obtainer 140, a determinator 142, a model call placer 144 and other system components 146. Operation of each of these systems is discussed further below. However, it is understood that some of the various systems shown in FIG. 1 can be implemented independently, combined, and/or stored in memory for one or more separate computing devices that are included in computer infrastructure 102. Further, it is understood that some of the systems and/or functionality may not be implemented, or additional systems and/or functionality may be included as part of environment 100. Other system components 146 may include other functionality required for operation of system 106 and understood by those with ordinary skill in the art, but not expressly described herein.

Figure 2:
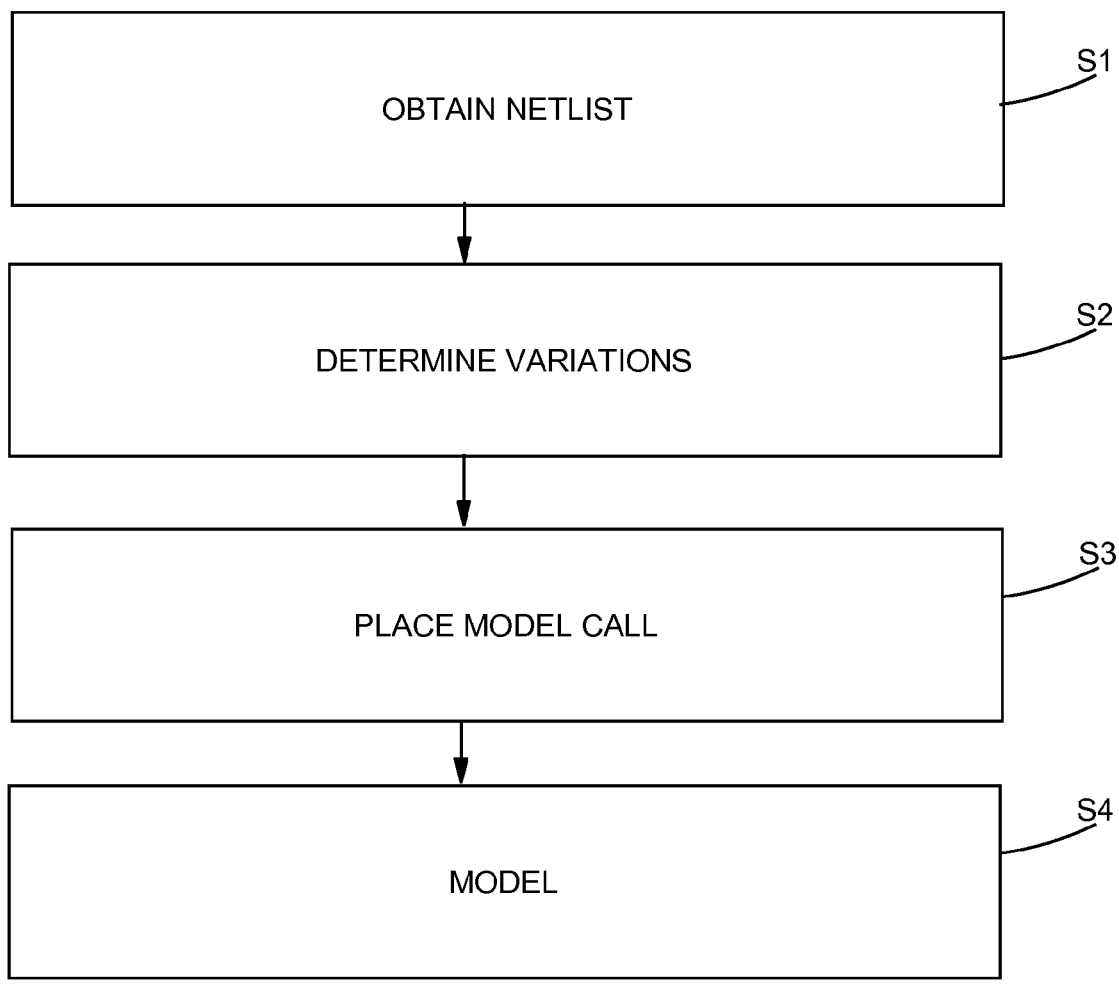
FIG. 2 shows a flow diagram of one embodiment of a method of operation of the computer infrastructure of FIG. 1.

Turning to FIG. 2, a flow diagram of one embodiment of a method of operation of the computer infrastructure 102 will now be described. Referring to FIGS. 1-2, in a first step S1, netlist obtainer 140 obtains netlist 92 of electrical elements. In one embodiment, this step may include receiving netlist 92 from parasitic extractor 130, e.g., via network 134. However, this is not the only possibility. Netlist 92 includes estimated electrical values for electrical elements and geometric data for at least one of the electrical elements. In one embodiment, geometric data may be provided in nodes that identify a location within an IC design and comments within netlist 92. One example of portion of a netlist may include the following electrical elements:

R10774 146:13906 146:13901 13.6585 $l=0.14 $w=0.14 $lvl=23
C25580 140:13936 146:13901 1.26475e-19
R13537 140:13936 140:13944 0.08815 $l=0.17 $w=0.42 $lvl=21

In this example, each electrical element (R10774, C25580 and R13537) includes two nodes locating the electrical element and an estimated electrical value. In addition, certain electrical elements (R10774 and R13537) include comments such as a level comment ($lvl) to identify the level at which the electrical element, e.g., resistor in the form of a wire, terminates, and a width comment ($w) and a length comment ($l) indicating a width and length of the electrical element. In this example, R10774 indicates a resistor (e.g., a wire) having nodes 146:13906 and 146:13901, an estimated electrical value of 13.6585 m-Ohms, a length ($l) of 0.14 nm, a width ($w) of 0.14 nm, and a termination point in level 23. R13537 indicates a resistor (e.g., a wire) having nodes 14:13936 and 140:13944, an estimate electrical value of 0.08815 m-Ohms, a length ($l) of 0.17 nm, a width ($w) of 0.42 nm, and a termination point in level 21. C25580 indicates a capacitor between resistors R10774 and R13537 having nodes 140:13936 and 146:13901, and an estimated electrical value of 1.26475e-19 F. Note that each resistor shares a node with the capacitor. Since the resistors terminate in different levels, i.e., 21 and 23, this indicates that capacitor C25580 represents a capacitance that extends vertically within the IC design. Where the levels of the resistors are identical, the capacitor simply represents a capacitance that extends laterally within a level of the IC design. Although level, width and length comments are illustrated, it is understood that a variety of different comments may be employed and are considered within the scope of the invention.

In step S2, determinator 142 determines variations of the electrical value for a selected electrical element (e.g., C25580 in above example) based on the geometric data using a scaling methodology. The selected electrical element may include any structure within netlist 92, for example, a capacitor or a resistor. The geometric data used may vary and may be user defined. For example, the fact that capacitor C25580 represents a vertically extending capacitance, its nodes, and/or its corresponding resistors level, etc., may be used in determining variations of the electrical value therefor. In one embodiment, the selected electrical element's location may be used to determine the variations. The scaling methodology may include any now known or later developed technique for establishing scaled values for the electrical value. In one example, a lookup table may be employed to provide a maximum and minimum value for the electrical value, perhaps extending evenly about the estimated electrical value. In another example, a lookup table could provide a maximum multiplier (e.g., 1.3) and a minimum multiplier (e.g., 0.4) for the estimated electrical value to arrive at a maximum and minimum value for the electrical value. Another possibility is to employ an algorithm that automatically generates a maximum and minimum value. Different scaling methodologies may be employed for different geometric data.

The number of variations of the electrical value determined by determinator 142 may also vary. For example, the variations of the electrical value may include a value less than the electrical value, the electrical value and a value greater than the electrical value. For capacitor C25580, the values may include, for example: 9.48563e-20 F, the original estimated electrical value 1.26475e-19 F, and 1.58094e-19 F. In one embodiment, the value less than may be a multiple (e.g., 3) of a standard deviation ($\sigma$) of the electrical value, and the value greater than is a multiple (e.g., 2) of the standard deviation ($\sigma$) of the electrical value.

Determinator 142 may also determine a geometric characteristic of the selected electrical element from the geometric data. For example, determinator 142 may determine a geometric characteristic including one or more of: a dimension (e.g., area, length, etc.), a location, an orientation (e.g., extends vertically, laterally, a shape, or any other geometric characteristic of the selected electrical element) that may impact electrical function and should be modeled. Where determinator 142 determines a geometric characteristic, the variations of the electrical value may be based on the geometric characteristic instead of the plain geometric data.

It is understood that while only one selected electrical element is discussed above that the invention may be employed to determine variations for each electrical element, i.e., BEOL parasitic resistance and/or capacitance, in netlist 92.

In step S3, model call placer 144 places a model call in netlist 92. The model call may be any instruction that implements the variations of electrical value for the selected electrical element. In one embodiment, model call placer 144 produces a revised netlist 192 including a model call for at least one different electrical element within netlist 92. One example of a revised netlist 192 entry for capacitor C25580 in the above-described example may appear as follows:

C25580=MODEL wireCap(140:13936,146:13901)\
(PCAP0=9.48563e-20,PCAP5=1.26475e-19,
PCAP1=1.58094e-19)

In this example, capacitor C25580 would be modeled using the variation of electrical values: 9.48563e-20 F, the original estimated (nominal) electrical value 1.26475e-19 F, and 1.58094e-19 F. The model call instructs modeler 132 to run the simulation using these three different values. Hence, three netlists, each with a different electrical value are not necessary and only one computational run is required to model technology dependent process variations of electrical values. Similar model calls can be generated for any electrical element in netlist 92, e.g., resistors, transistors, etc. In one example, resistors may be scaled based on width, which is typically a major determinant in their electrical functioning. The scaling methodology used may base the variation on the original width.

Although not necessary to the invention, the above-described methodology may also include modeling the IC design (step S4) using modeler 134 and revised netlist 192 including the model call.

As discussed herein, various systems and components are described as "obtaining" data (e.g., netlist 92, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

While shown and described herein as a method and system for enabling a netlist for modeling of technology dependent BEOL process variation, it is understood that the invention further provides various alternative embodiments. For example, in one embodiment, the invention provides a program product stored on a computer-readable medium, which when executed, enables a computer infrastructure to enable a netlist for modeling of technology dependent BEOL process variation. To this extent, the computer-readable medium includes program code, such as netlist enabling system 106 (FIG. 1), which implements the process described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture (e.g., a compact disc, a magnetic disk, a tape, etc.), on one or more data storage portions of a computing device, such as memory 102 (FIG. 1) and/or storage system 122 (FIG. 1) (e.g., a fixed disk, a read-only memory, a random access memory, a cache memory, etc.), as a data signal traveling over a network (e.g., during a wired/wireless electronic distribution of the program product), on paper (e.g., capable of being scanned in as electronic data), and/or the like.

In another embodiment, the invention provides a method of generating a system for enabling a netlist for modeling of technology dependent BEOL process variation. In this case, a computer infrastructure, such as computer infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 104 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising, and/or fee basis. That is, a service provider, such as an application service provider (ASP), could offer to enable a netlist for modeling of technology dependent BEOL process variation as described herein. In this case, the service provider can manage (e.g., create, maintain, support, etc.) a computer infrastructure, such as computer infrastructure 102 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of enabling a netlist of an integrated circuit (IC) design for modeling of technology dependent back-end-of-line (BEOL) process variation, the method comprising:
   obtaining a netlist of electrical elements, the netlist including estimated electrical values for the electrical elements and geometric data for at least one of the electrical elements;
   determining variations of the electrical value for a selected electrical element based on the geometric data by scaling, wherein the scaling includes defining an interval between the maximum and minimum value for the selected electrical element generating selected variations of the electrical value within the interval using an algorithm, wherein the variations of the electrical value include a value less than the electrical value, the electrical value and a value greater than the electrical value, wherein the electrical value represents the electrical characteristic of the electrical element, and wherein the value less than is a multiple of a standard deviation of the electrical value, and the value greater than is a multiple of the standard deviation of the electrical value;
   placing a model call in the netlist, wherein each model call implements one or more of the selected variations of the electrical value for the selected electrical element; and
   modeling technology dependent BEOL process variation using the netlist.

2. The method of claim 1, wherein the obtaining includes receiving the netlist from a parasitic extractor.

3. The method of claim 1, further comprising determining a geometric characteristic of the selected electrical element from the geometric data, wherein the determining includes determining the variations of the electrical value based on the geometric characteristic.

4. The method of claim 3, wherein the geometric characteristic includes at least one of: a dimension, a location, a shape and an orientation.

5. The method of claim 1, wherein the geometric data includes a location of the at least one electrical element.

6. The method of claim 1, wherein the selected electrical element includes one of: a capacitor and a resistor.

7. The method of claim 1, wherein the selected electrical element includes each electrical element in the netlist.

8. The method of claim 1, further comprising modeling the IC design using the netlist including the model call.

9. A system for enabling a netlist of an integrated circuit (IC) design for modeling of technology dependent back-end-of line (BEOL) process variation, the system comprising:

an obtainer for obtaining a netlist of electrical elements, the netlist including estimated electrical values for the electrical elements and geometric data for at least one of the electrical elements;

a determinator for determining variations of the electrical value for a selected electrical element based on the geometric data by scaling, wherein the scaling includes defining an interval between the maximum and minimum value for the selected electrical element a generator for generating selected variations of the electrical value within the interval using an algorithm, wherein the variations of the electrical value include a value less than the electrical value, the electrical value and a value greater than the electrical value, wherein the electrical value represents the electrical characteristic of the electrical element, and wherein the value less than is a multiple of a standard deviation of the electrical value, and the value greater than is a multiple of the standard deviation of the electrical value;

a placer for placing a model call in the netlist, wherein each model call implements one or more of the selected variations of the electrical value for the selected electrical element; and a modeler for modeling technology dependent BEOL process variation using the netlist.

10. The system of claim 9, wherein the obtainer receives the netlist from a parasitic extractor.

11. The system of claim 9, wherein the determinator determines a geometric characteristic of the selected electrical element from the geometric data, wherein the variations of the electrical value are based on the geometric characteristic.

12. The system of claim 11, wherein the geometric characteristic includes at least one of: a dimension, a location, a shape and an orientation.

13. The system of claim 9, wherein the geometric data includes a location of the at least one electrical element.

14. The system of claim 9, wherein the selected electrical element includes one of: a capacitor and a resistor.

15. The system of claim 9, wherein the selected electrical element includes each electrical element in the netlist.

16. A program product stored on a computer-readable medium, which when executed by a computer system or process, enables a netlist of an integrated circuit (IC) design for modeling of technology dependent back-end-of-line (BEOL) process variation, the program product comprising:

program code for obtaining a netlist of electrical elements, the netlist including estimated electrical values for the electrical elements and geometric data for at least one of the electrical elements;

program code for determining variations of the electrical value for a selected electrical element based on the geometric data by scaling, wherein the scaling methodology includes defining an interval between the maximum and minimum value for the selected electrical element program code for generating selected variations of the electrical value within the interval using an algorithm, wherein the variations of the electrical value include a value less than the electrical value, the electrical value and a value greater than the electrical value, wherein the electrical value represents the electrical characteristic of the electrical element, and wherein the value less than is a multiple of a standard deviation of the electrical value, and the value greater than is a multiple of the standard deviation of the electrical value;

program code for placing a model call in the netlist, wherein each model call implements one or more of the selected variations of the electrical value for the selected electrical element; and program code for modeling technology dependent BEOL process variation using the netlist.

17. The program product of claim 16, wherein the determining code determines a geometric characteristic of the selected electrical element from the geometric data, and determines the variations of the electrical value based on the geometric characteristic.

* * * * *